US008688719B2

(12) United States Patent
Sekaran et al.

(10) Patent No.: US 8,688,719 B2
(45) Date of Patent: Apr. 1, 2014

(54) TARGETED TELEPHONE NUMBER LISTS FROM USER PROFILES

(75) Inventors: Dhigha D. Sekaran, Redmond, WA (US); Amey Parandekar, Kirkland, WA (US); Krishnan Ananthanarayanan, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 62 days.

(21) Appl. No.: 13/306,985

(22) Filed: Nov. 30, 2011

(65) Prior Publication Data
US 2013/0138621 A1 May 30, 2013

(51) Int. Cl.
G06F 7/00 (2006.01)
G06F 17/30 (2006.01)
G06F 15/16 (2006.01)

(52) U.S. Cl.
USPC .......................................... 707/754; 707/732

(58) Field of Classification Search
USPC .......................................... 707/754, 732, 705
See application file for complete search history.

(56) References Cited

U.S. PATENT DOCUMENTS

| 5,937,037 | A * | 8/1999 | Kamel et al. | 379/88.19 |
| 7,120,236 | B1 * | 10/2006 | Schneider | 379/201.01 |
| 7,330,890 | B1 * | 2/2008 | Partovi et al. | 709/224 |
| 7,886,048 | B1 | 2/2011 | Holland et al. | |
| 2003/0144846 | A1 * | 7/2003 | Denenberg et al. | 704/277 |
| 2006/0056599 | A1 * | 3/2006 | Cragun | 379/67.1 |
| 2008/0215976 | A1 | 9/2008 | Bierner et al. | |
| 2009/0061872 | A1 * | 3/2009 | Hicks | 455/436 |
| 2009/0282034 | A1 | 11/2009 | Goronzy et al. | |
| 2011/0087969 | A1 * | 4/2011 | Hein et al. | 715/752 |

OTHER PUBLICATIONS

Wikipedia contributors. Phoneword. Wikipedia, the Free Encyclopedia, http://web.archive.org/web/20100721211730/http://en.wikipedia.org/wiki/Phoneword, Jul. 21, 2010. [accessed Mar. 8, 2013].*
"Letting consumers choose their own (vanity) phone number", Retrieved at <<http://www.springwise.com/telecom_mobile/nameyournumber/>>, Aug. 12, 2010, pp. 6.

* cited by examiner

Primary Examiner — Greta Robinson
Assistant Examiner — Brian E. Weinrich
(74) Attorney, Agent, or Firm — Sonia Cooper; Jim Ross; Micky Minhas

(57) ABSTRACT

A data structure that includes a user profile including user profile information, and a data structure comprising a set of available telephone numbers can be accessed. A targeted list of one or more telephone numbers can be generated using the set of available telephone numbers and information from the user profile. The targeted list can include one or more telephone numbers from the set of available telephone numbers that match at least a portion of the user profile information. Also, the targeted list can be sent to a rendering computing environment for display. User input selecting a telephone number from the targeted list can be received. In response to user input, the selected telephone number can be associated with a user profile in a data structure.

20 Claims, 6 Drawing Sheets

TARGETED TELEPHONE NUMBER LISTS FROM USER PROFILES

BACKGROUND

Individuals and businesses often seek to obtain vanity or personalized telephone numbers. For example, a vanity telephone number may include digits that are directly significant to a user or business, and/or digits that correspond to letters on a standard telephone keypad that spell a word, acronym, and/or phrase of interest to the user or business. Some web-based tools have been available to allow a user to enter a word or number and view a list of available telephone numbers, if any, that spell the entered word (with corresponding letters on a standard telephone keypad) or include the entered number.

SUMMARY

The tools and techniques discussed herein relate to generating a targeted list of telephone numbers using information from a user profile and a set of available telephone numbers. The targeted list of telephone numbers can include one or more telephone numbers from the set of available telephone numbers that match at least a portion of the user profile information. Matching of a telephone number with user profile information or with a piece of information from a user profile refers to at least a portion of the telephone number matching information that is derived from the user profile or from the piece of information from the user profile. For example, at least a portion of the telephone number may correspond to letters on a standard telephone keypad that spell a word from the user profile or a synonym of a word from the user profile (e.g., a word for a hobby, occupation, name, location, hometown, name of business, etc.). As another example, at least a portion of the telephone number may correspond to letters on a standard telephone keypad that spell a phrase that is related to an occupation or hobby listed in the profile.

In one embodiment, the tools and techniques can include accessing a data structure that includes a user profile including user profile information, and accessing a data structure comprising a set of available telephone numbers. A targeted list of one or more telephone numbers can be generated using the set of available telephone numbers and information from the user profile. The targeted list can include one or more telephone numbers from the set of available telephone numbers that match at least a portion of the user profile information. Also, the targeted list can be sent to a rendering computing environment to be displayed.

In another embodiment of the tools and techniques, a targeted list of one or more telephone numbers can be derived from a set of available telephone numbers and from user profile information from a source user profile. User input selecting a telephone number from the targeted list can be received. In response to user input, the selected telephone number can be associated with a user profile.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
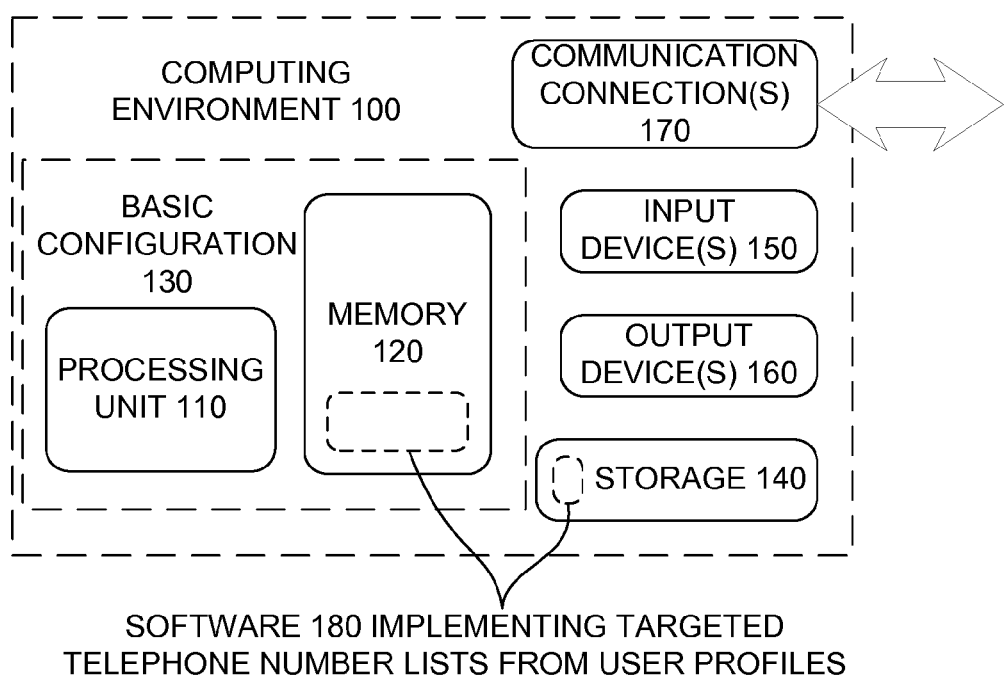
FIG. 1 is a block diagram of a suitable computing environment in which one or more of the described embodiments may be implemented.

Embodiments described herein are directed to techniques and tools for improvements related to targeted telephone number lists. Such improvements may result from the use of various techniques and tools separately or in combination.

Such techniques and tools may include automatically suggesting to a user a list of numbers which are based on the user's existing profile information, such as name, location, birthday, hometown, name of business, etc. For example, the profile information may come from one or more user profiles (such as user profiles (222) in a user profile data structure (220), illustrated in FIG. 2, which is discussed more below), such as social networking profiles (224), business profiles (226), general Web services profiles (228), etc. In one example, a user named Joe may use a Web portal to sign up for a telephone service. Joe may have a home address in Redmond (area code 425) and might have a business called Reliable Plumbing. Using information such as this business and address information from an existing user profile for Joe (e.g., a social networking profile), a targeted telephone number list might come up with suggested telephone numbers for Joe, such as 42-RELIABLE (427-354-2253), or 425-JOE-1234 (425-563-1234). The numbers can be presented to Joe in a rendering environment, such as a client computing device being used by Joe. For example, the client computing device could be a mobile telephone to which a phone number will be assigned, an in-store kiosk, a Web browsing device (e.g., a desktop computer, a laptop computer, a slate device, a smart phone, etc. that hosts a Web browser application).

One or more benefits may be realized from the tools and techniques described herein. For example, the targeted list can make it easier for users to pick a number of their choice. For example, the targeted list may be used to proactively solicit potential customers for a telephone service by presenting the potential customers with telephone numbers that are personalized to the potential customers. Such benefits may be realized without the users having to type in search terms to be searched for corresponding numbers. The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a system for generating targeted lists of telephone numbers, a telephone number provider system, a system for associating telephone numbers with user profiles, a user input environment and/or a rendering environment. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing targeted telephone number lists from user profiles.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "associate," "generate," "derive," "send," "receive," "instruct," and "access" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
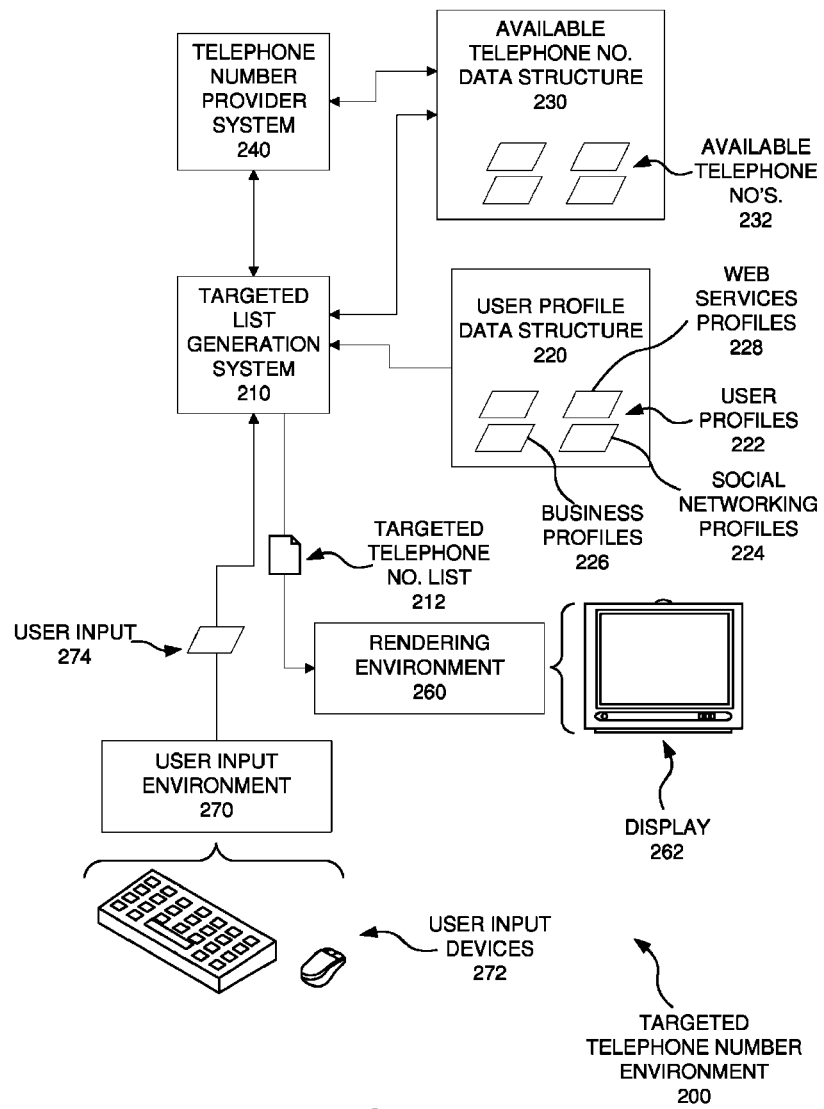
FIG. 2 is a schematic diagram of a targeted telephone number environment.

II. System and Environment for Targeted Telephone Number Lists from User Profiles FIG. 2 is a schematic diagram of a targeted telephone number environment (200) in conjunction with which one or more of the described embodiments may be implemented. Communications links (as depicted by single and double arrow lines) between the various components of FIG. 2 may be conducted in any of various ways, such as by sending information between components of a local system (e.g., through application programming interfaces, function calls, etc.) and/or sending information between components of remote systems (e.g., through sending messages over a computer network, etc.). Accordingly, the components illustrated in FIG. 2 may be included in a single computing machine or spread over multiple computing machines.

The environment (200) can include a targeted telephone list generation system (210), which can generate a targeted telephone number list (212). The environment (200) can also include a user profile data structure (220) that includes one or more user profiles (222). Additionally, the environment (200) can include an available telephone number data structure (230). The available telephone number data structure (230) can store available telephone numbers (232).

The targeted list generation system (210) can access the user profiles (222) and the available telephone numbers (232). The targeted list generation system (210) may access the user profiles (222) and available telephone numbers (232) directly (as illustrated by arrowed lines leading directly between the targeted list generation system (210) and the data structures (220 and 230)). For example, the targeted list generation system (210) may be part of an overall system and environment that manages the user profiles (222) and/or the available telephone numbers (232). The targeted list generation system (210) may interact with one or more other systems that manage the user profiles (222) and/or the available telephone numbers (232). As an example, a telephone number provider system (240) may manage the available telephone number data structure (230), and the targeted list generation system (210) may access the available telephone numbers (232) by interacting with the telephone number provider system (240). For example, the targeted list generation system (210) may send one or more potential telephone numbers to the telephone number provider system (240), asking whether those telephone numbers are among the available telephone numbers. The telephone number provider system (240) may respond by informing the targeted list generation system (210) as to which of those telephone numbers are available.

In accessing the information in the user profiles (222), steps may be taken to provide reasonable privacy protections for the information in the profiles (222). For example, access to a user profile (222) may only be allowed when credentials have been provided, such as through user input. Also, notifications may be provided when the information for a user profile (222) is being accessed and/or revised.

Referring still to FIG. 2, the targeted list generation system (210) can use information from a user profile (222) and the set of available telephone numbers (232) to generate a targeted telephone number list (212) for that user profile (222). This may be done in various ways. For example, the targeted list generation system (210) can generate a preliminary list of potential telephone numbers using information from the user profile (222) (e.g., area code, name, occupation, etc.). Potential numbers that are not among the set of available telephone numbers (232) can be filtered out of the preliminary list to produce the targeted telephone number list (212) for the user profile (222). As another example, the targeted list generation system (210) may begin with the set of available telephone numbers (232), and that set of available telephone numbers (232) can be queried for telephone numbers that match the information for the subject user profile (222) for which the targeted telephone number list (212) is being generated. In either scenario, or in other scenarios, the search for telephone numbers that match the subject user profile (222) may be expanded in any of various ways (e.g., by searching for numbers that correspond to synonyms for words in the user profile (222), numbers that correspond to phrases related to words in the profile (222), etc.).

Referring still to FIG. 2, the targeted telephone number list (212) can be sent to a rendering environment (260), where the list can be rendered on a display (262). The rendering environment (260) may be a separate environment that is remote from the targeted list generation system (210). For example, the targeted telephone number list (212) may be sent to the rendering environment (260) over a computer network, such as a global computer network. In one implementation, the targeted telephone number list (212) may be sent over a global computer network and formatted for inclusion in a Web page to be rendered using a Web browser application in the rendering environment. As another example, the targeted telephone number list (212) may be sent to the rendering environment in a message, such as a text message or an email message. As another example, the rendering environment (260) may be local to the targeted list generation system (210), and the targeted telephone number list (212) may be sent to the rendering environment in a function call, an application programming interface call, etc.

Additionally, the targeted telephone number environment (200) can include a user input environment (270), which can include one or more user input devices (272) to provide user input (274) to the targeted list generation system (210). The user input environment (270) may be in the same environment as the rendering environment (260), such as on the same physical computing machine.

As an example of the user input (274), the user input (274) may request the targeted telephone number list (212) (although in some scenarios the targeted telephone number list (212) may be provided to the rendering environment (260) and displayed without user input requesting the targeted telephone number list (212)). As another example, the user input (274) may select a telephone number from the displayed targeted telephone number list (212). In response to such user input, the targeted list generation system (210) and/or some other system may associate the selected telephone number with a user profile in a telephone number assignment data structure (which may be the same data structure as the user profile data structure (220), or some other data structure). The user profile with which the telephone number is associated may be the same as the user profile (222) that was used to generate the targeted telephone number list (212). Alternatively, the user profile with which the telephone number is associated may be a different user profile from the user profile (222) that was used to generate the targeted telephone number list (212), and the user profile may be in a different data structure. For example, in response to user input selecting a telephone number from the targeted telephone number list (212), a new user profile may be created and associated with the selected telephone number. The association of the selected telephone number with a user profile may be made or represented in a data structure, such as the user profile data structure (220) or some other data structure. In one example, that data structure may take the form of a message sent to inform another system (such as the telephone number provider system (240)) of the association of the selected telephone number with a user profile.

Figure 3:
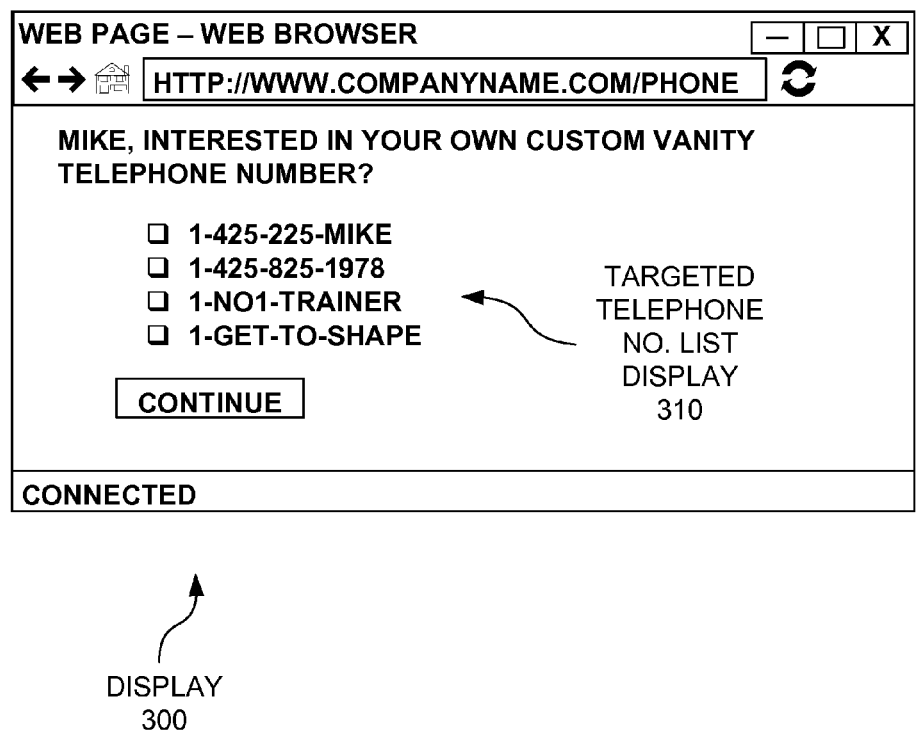
FIG. 3 is an illustration of an example of a display of a targeted telephone number list.

Referring now to FIG. 3, an example of a display (300) of a targeted telephone number list will be discussed. In this example, a source user profile may indicate a first name of "Mike", a hometown of Redmond Wash. (area code 425), a birth date of Aug. 25, 1978, and a primary occupation as a trainer in a gym. For example, the user profile may be a social network profile. When credentials for this user profile are provided to log into the social network, the display (300) of FIG. 3 may be automatically generated in a remote server system and rendered with the client browser application. The display (300) can include a telephone number list display (310) that was generated using the information listed above, with the following displayed numbers: 1-425-225-MIKE (1-425-225-6453); 1-425-825-1978; 1-NO1-TRAINER (1-661-872-4637); and 1-GET-TO-SHAPE (1-438-867-4273). As can be seen, the first name "MIKE" is included in the first telephone number (matching the first name "MIKE" in the user profile), the digits 8251978 are included in the second telephone number (matching the birth date Aug. 25, 1978, or 8-25-1978 in the user profile), the phrase "NO1-TRAINER" is included in the third telephone number (matching the trainer occupation in the user profile), and the phrase "GET-TO-SHAPE" is included in the fourth telephone number (also matching the trainer occupation in the user profile by corresponding to a phrase that is related to the occupation).

User input can be provided to select a telephone number from the targeted telephone number list display (310), such as by providing user input directed at the display of the selected telephone number (e.g., by clicking on the checkbox to the right of the selected telephone number). The button labeled "CONTINUE" may be selected to continue with the selection of a selected telephone number (if one of the checkboxes has been selected), or continue without selecting a telephone number (if one of the checkboxes has not been selected).

III. Techniques for Targeted Telephone Number Lists from User Profiles

Several techniques for targeted telephone number lists from user profiles will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique.

Figure 4:
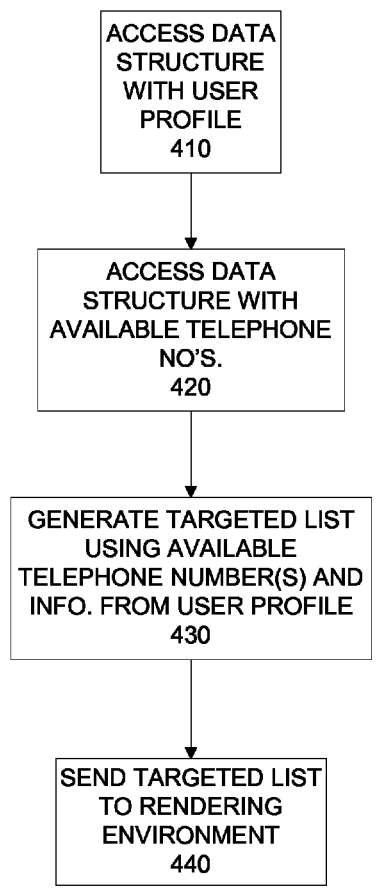
FIG. 4 is a flowchart of a technique for targeted telephone number lists from user profiles.

Referring to FIG. 4, a technique for targeted telephone number lists from user profiles will be described. The technique can include accessing (410) a data structure that includes a user profile and accessing (420) a data structure that includes a set of available telephone numbers. The data structure that includes the user profile and the data structure that includes the set of available telephone numbers may be the same data structure or different data structures. A targeted list of one or more telephone numbers can be generated (430) using the set of available telephone numbers and information from the user profile. The targeted list can include one or more telephone numbers from the set of available telephone numbers that match at least a portion of the user profile information. For example, generating (430) the targeted list can include generating a list of telephone numbers using the information from the user profile, and filtering out telephone numbers that are not included in the set of available telephone numbers.

The targeted list can be sent (440) to a rendering computing environment that includes a display for displaying the targeted list. The technique of FIG. 4 may be performed without user input from the rendering environment requesting the targeted list, and the technique of FIG. 4 can be performed automatically. For example, the technique may be performed automatically to send the targeted list in an email message. Sending (440) the targeted list to the rendering environment may be done in response to receiving user input signing into a computer system that manages the user profile. For example, the targeted list may be sent (440) in a Web page format in response to a user providing user input to log into a social network that includes the user profile. Sending (440) the targeted list may include sending the targeted list over a computer network, such as sending the targeted list in a message over a computer network. Alternatively, the targeted list may be sent within a computing machine in a function call, an application programming interface, etc.

The technique of FIG. 4 may also include receiving user input selecting a telephone number from the targeted list. In response to the user input, the selected telephone number can be associated with a user profile in a data structure, which may be a separate telephone assignment data structure or a data structure that includes other information as well (such as a user profile data structure that includes user profile information). The user profile with which the selected telephone number is associated can be the user profile used to generate the targeted list. Alternatively, the user profile with which the selected telephone number is associated can be a different user profile from the user profile used to generate the targeted list.

The targeted list can further include one or more additional telephone numbers whose availability can be requested. The one or more additional telephone numbers can each match at least a portion of the user profile information. The technique may further include requesting availability of at least one of the one or more additional telephone numbers. For example, in the targeted telephone number environment (200) discussed above with reference to FIG. 2, the targeted list generation system (210) may request availability of the additional telephone number(s) from the telephone number provider system (240). Also, requesting availability of at least one of the one or more additional telephone numbers may be done in response to user input.

Figure 5:
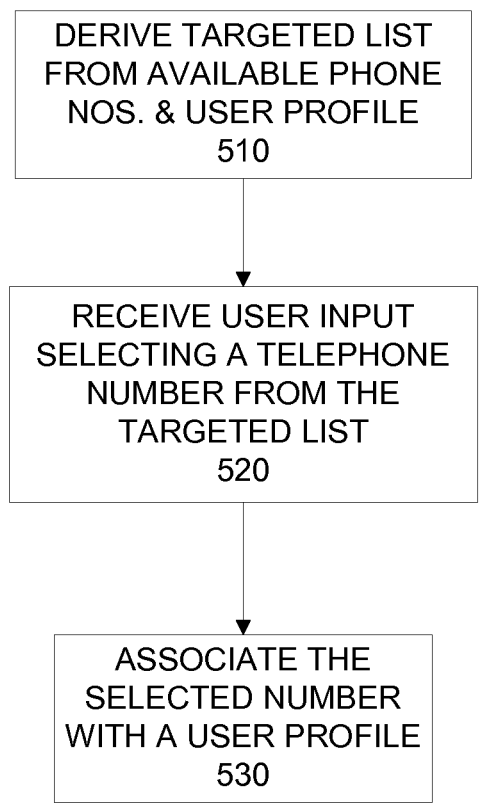
FIG. 5 is a flowchart of another technique for targeted telephone number lists from user profiles.

Referring to FIG. 5, a technique for targeted telephone number lists from user profiles will be described. The technique can include deriving (510) a targeted list of one or more telephone numbers from a set of available telephone numbers and from user profile information from a source user profile. The targeted list can include one or more telephone numbers from the set of available numbers that match at least a portion of the user profile information. Also, at least one telephone number in the targeted list can be derived from a piece of information from the user profile information, where the piece of information is selected from a group consisting of a first name, a last name, a birth date, a nickname, a hometown, an occupation, a hobby, an interest, and combinations thereof. User input can be received (520), where the user input selects a telephone number from the targeted list. In response to the user input, the selected telephone number can be associated (530) with a user profile, which may be the same as or different from the user profile with the user profile information. The association of the selected telephone number with the user profile can be made in a data structure.

The technique of FIG. 5 may further include sending the targeted list of telephone numbers to a rendering computing environment. Additionally, the technique may include instructing the rendering computing environment to display the targeted list of telephone numbers. The source user profile may be a social network profile.

Figure 6:
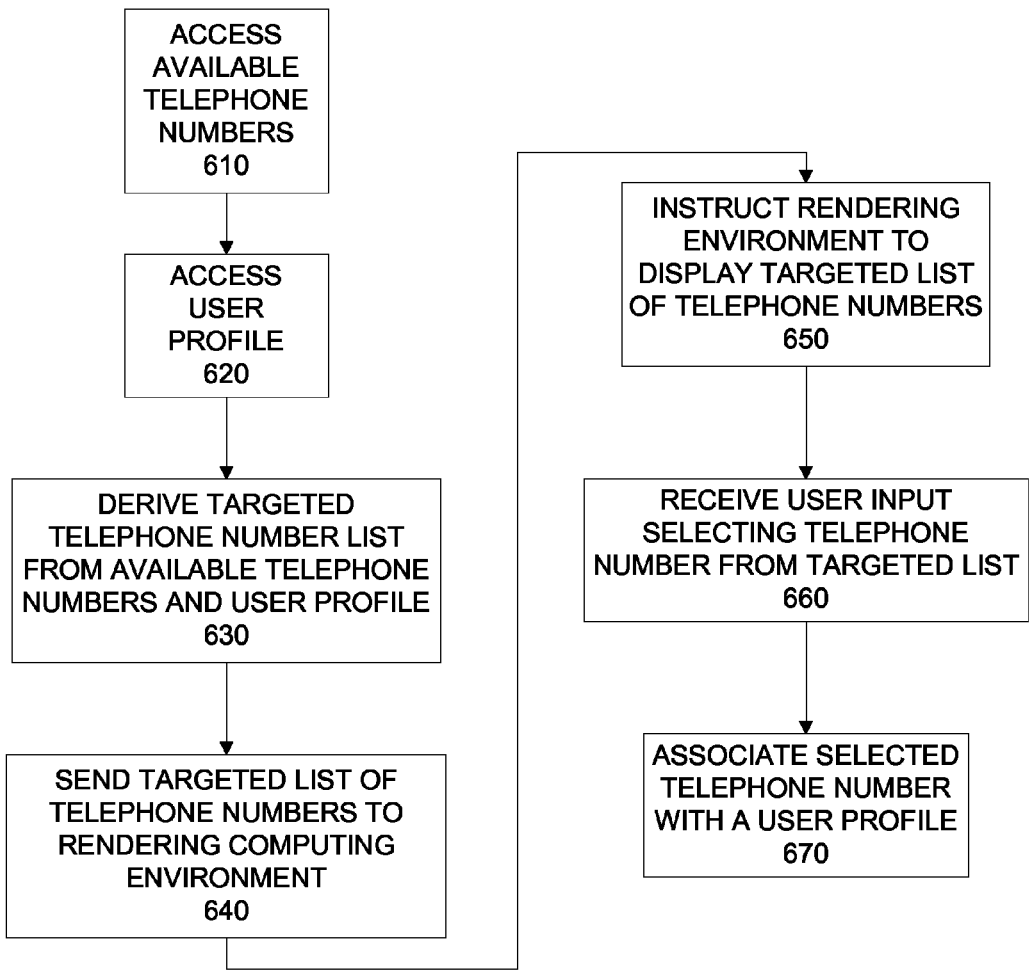
FIG. 6 is a flowchart of yet another technique for targeted telephone number lists from user profiles.

Referring to FIG. 6, a technique for targeted telephone number lists from user profiles will be described. The technique can include accessing (610) a set of available telephone numbers, and accessing (620) user profile information from a source user profile. A targeted list of one or more telephone numbers can be derived (630) from the set of available telephone numbers and from the user profile information. At least one telephone number in the targeted list can match a piece of information from the user profile, where the piece of information can be selected from a group consisting of a first name, a last name, a birth date, a nickname, a hometown, an occupation, a hobby, an interest, and combinations thereof. The targeted list of telephone numbers can be sent (640) to a rendering computing environment. The rendering computing environment can be instructed (650) to display the targeted list of telephone numbers. User input selecting a telephone number from the targeted list can be received (660). In response to the user input, the selected telephone number can be associated (670) with a user profile, and that association can be made in a data structure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
accessing a data structure comprising a user profile, the user profile comprising user profile information;
accessing a data structure comprising a set of available telephone numbers;
generating a targeted list of one or more telephone numbers using the set of available telephone numbers and the user profile information, the targeted list comprising one or more available telephone numbers from the set of available telephone numbers that match at least a portion of the user profile information, the targeted list further comprising one or more additional telephone numbers whose availability to be associated with a user profile in a telephone number assignment data structure is configured to be requested after the generation of the targeted list, the one or more additional telephone numbers being different from the set of available telephone numbers, generating the targeted list comprising determining that the one or more available telephone numbers and the one or more additional telephone numbers are matching telephone numbers that match the at least a portion of the user profile information, and determining that matching telephone numbers match the at least a portion of the user profile information comprising:
deriving one or more terms from information comprising representations of letters in the user profile information; and
determining that the one or more matching telephone numbers each includes at least one matching sequence of digits that matches an order of letters in at least one of the one or more terms, with a digit of a sequence matching a letter of a term by corresponding to a letter on a standard telephone keypad that is the same as the letter of the term; and
sending the targeted list to a rendering computing environment that includes a display.

2. The method of claim 1, further comprising:
receiving user input selecting a telephone number from the targeted list; and
in response to the user input, associating the selected telephone number with a user profile in the telephone number assignment data structure.

3. The method of claim 2, wherein the user profile with which the selected telephone number is associated is the user profile used to generate the targeted list.

4. The method of claim 2, wherein the user profile with which the selected telephone number is associated is a different user profile from the user profile used to generate the targeted list.

5. The method of claim 1, wherein the method is performed automatically.

6. The method of claim 1, wherein the method is performed without user input requesting the targeted list.

7. The method of claim 6, wherein sending the targeted list to the rendering environment comprises sending a message over a computer network.

8. The method of claim 6, wherein sending the targeted list to the rendering environment is done in response to receiving user input signing into a computer system that manages the user profile.

9. The method of claim 1, wherein sending the targeted list to the rendering environment comprises sending the targeted list over a computer network.

10. The method of claim 1, wherein generating the targeted list using the set of available telephone numbers and information from the user profile comprises:
generating a list of telephone numbers using the information from the user profile; and
filtering out telephone numbers that are not included in the set of available telephone numbers.

11. The method of claim 1, wherein method further comprises requesting availability of at least one of the one or more additional telephone numbers to be associated with a user profile in a telephone number assignment data structure after the generation of the targeted list.

12. The method of claim 11, wherein requesting availability of at least one of the one or more additional telephone numbers is done in response to user input.

13. One or more computer-readable storage media having computer-executable instructions embodied thereon that, when executed by at least one processor, cause at least one processor to perform acts comprising:

accessing a set of available telephone numbers;

accessing user profile information from a source user profile;

deriving a targeted list of one or more telephone numbers from the set of available telephone numbers and from the user profile information, the one or more telephone numbers in the targeted list comprising one or more available telephone numbers in the set of available telephone numbers and the targeted list further comprising one or more additional telephone numbers whose availability to be associated with a user profile in a telephone number assignment data structure is configured to be requested after the derivation of the targeted list, the one or more additional telephone numbers being different from telephone numbers in the set of available telephone numbers, at least one of the available telephone numbers and at least one of the additional telephone numbers in the targeted list each matching a piece of information from the user profile, deriving the targeted list comprising determining that the at least one of the available telephone numbers and the at least one of the additional telephone numbers matches the piece of information from the user profile, and the determining that the at least one of the available telephone numbers and the at least one of the additional telephone numbers matches the piece of information from the user profile comprising:

deriving one or more terms from information comprising representations of letters in the piece of information; and determining that each telephone number of the at least one of the available telephone numbers and the at least one of the additional telephone numbers includes at least one matching sequence of digits that matches an order of letters in at least one of the one or more terms, with a digit of a sequence matching a letter of a term by corresponding to a letter on a standard telephone keypad that is the same as the letter;

sending the targeted list of telephone numbers to a rendering computing environment; and instructing the rendering computing environment to display the targeted list of telephone numbers.

14. The method of claim 1, wherein the targeted list is configured to respond to selection of an available telephone number of the available telephone numbers by initiating a process to associate the selected available telephone number with a user profile in the telephone number assignment data structure, and wherein the targeted list is configured to respond to selection of an additional telephone number in the targeted list by initiating a process to request availability of the selected additional telephone number to be associated with a user profile in the telephone number assignment data structure.

15. A computer system comprising:
at least one processor; and
memory comprising instructions stored thereon that when executed by at least one processor cause at least one processor to perform acts comprising:

deriving a targeted list of one or more telephone numbers from a set of available telephone numbers and from user profile information from a source user profile, the source user profile being stored separately from the set of available telephone numbers, the targeted list comprising one or more available telephone numbers from the set of available telephone numbers that match at least a portion of the user profile information, the targeted list further comprising one or more additional telephone numbers whose availability to be associated with a user profile in a telephone number assignment data structure is configured to be requested after the deriving of the targeted list, the one or more additional telephone numbers being different from the set of available telephone numbers, deriving the targeted list comprising determining that the one or more available telephone numbers and the one or more additional telephone numbers match the user profile information, and the determining that the one or more available telephone numbers and the one or more additional telephone numbers match the user profile information comprising deriving one or more terms from information comprising representations of letters in the user profile information and determining that one or more matching telephone numbers in the targeted list each includes at least one matching sequence of digits that matches an order of letters in at least one of the one or more terms, with a digit of a sequence matching a letter of a term by corresponding to a letter on a standard telephone keypad that is the same as the letter of the term; and receiving user input selecting a telephone number from the targeted list.

16. The computer system of claim 15, wherein at least one telephone number in the targeted list is derived from a piece of information from the user profile information, the piece of information being selected from a group consisting of a first name, a last name, a birth date, a nickname, a hometown, an occupation, a hobby, an interest, and combinations thereof.

17. The computer system of claim 15, wherein the acts further comprise sending the targeted list of telephone numbers to a rendering computing environment.

18. The computer system of claim 17, wherein the acts further comprise instructing the rendering computing environment to display the targeted list of telephone numbers.

19. The computer system of claim 15, wherein the source user profile is a social network profile.

20. The one or more computer-readable storage media of claim 13, wherein the targeted list is configured to respond to selection of an available telephone number of the available telephone numbers by initiating a process to associate the selected available telephone number with a user profile in the telephone number assignment data structure, and wherein the targeted list is configured to respond to selection of an additional telephone number in the targeted list by initiating a process to request availability of the selected additional telephone number to be associated with a user profile in the telephone number assignment data structure.

* * * * *